US012676652B2

(12) United States Patent
Li et al.

(10) Patent No.: US 12,676,652 B2
(45) Date of Patent: Jul. 7, 2026

(54) NB-IoT REALIZATION IN ACTIVE ANTENNA SYSTEM

(71) Applicant: Telefonaktiebolaget LM Ericsson (PUBL), Stockholm (SE)

(72) Inventors: Ming Li, Stockholm (SE); Bo Göransson, Sollentuna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 597 days.

(21) Appl. No.: 17/995,556

(22) PCT Filed: Apr. 6, 2020

(86) PCT No.: PCT/IB2020/053268
§ 371 (c)(1),
(2) Date: Oct. 5, 2022

(87) PCT Pub. No.: WO2021/205201
PCT Pub. Date: Oct. 14, 2021

(65) Prior Publication Data
US 2023/0223999 A1     Jul. 13, 2023

(51) Int. Cl.
*H04B 7/06* (2006.01)
*H04L 5/00* (2006.01)

(52) U.S. Cl.
CPC ......... *H04B 7/0608* (2013.01); *H04L 5/0094* (2013.01)

(58) Field of Classification Search
None
See application file for complete search history.

(56) References Cited

U.S. PATENT DOCUMENTS

| | | | | |
|---|---|---|---|---|
| 11,159,355 | B2 * | 10/2021 | Kumar | H04L 27/2692 |
| 2011/0128924 | A1 * | 6/2011 | Coon | H04B 7/068 |
| | | | | 370/329 |
| 2012/0194385 | A1 * | 8/2012 | Schmidt | H01Q 25/00 |
| | | | | 342/368 |
| 2014/0204809 | A1 * | 7/2014 | Kim | H04L 5/0053 |
| | | | | 455/434 |
| 2015/0003325 | A1 * | 1/2015 | Sajadieh | H04J 11/005 |
| | | | | 370/328 |

(Continued)

FOREIGN PATENT DOCUMENTS

WO      2019 148433 A1      8/2019

OTHER PUBLICATIONS

PCT International Search Report issued for International application No. PCT/IB2020/053268—Dec. 2, 2020.

(Continued)

*Primary Examiner* — Christopher T Wyllie
(74) *Attorney, Agent, or Firm* — Baker Botts L.L.P.

(57) ABSTRACT

A method performed by a network node comprising an active antenna system in a telecommunication network. The network node can identify a plurality of available branches from a plurality of branches of the active antenna system for supporting a narrowband signal. The network node can further map at least two available branches from the plurality of available branches to at least one subcarrier of a plurality of subcarriers from the narrowband signal, wherein each of the at least two available branches are mapped to different sets of subcarriers from the plurality of subcarriers.

15 Claims, 15 Drawing Sheets

(56) References Cited

U.S. PATENT DOCUMENTS

| | | | | |
|---|---|---|---|---|
| 2015/0063287 A1* | 3/2015 | Mazzarese | ............ | H04W 24/10 |
| | | | | 370/329 |
| 2016/0105265 A1* | 4/2016 | Wang | .................... | H04L 5/0048 |
| | | | | 370/252 |
| 2017/0265156 A1* | 9/2017 | Xue | ...................... | H04L 5/0064 |
| 2018/0220406 A1* | 8/2018 | Mizusawa | ............ | H04W 16/28 |
| 2019/0141693 A1* | 5/2019 | Guo | ...................... | H04L 5/0053 |
| 2020/0028637 A1* | 1/2020 | Wolff | .................... | H04L 5/0005 |
| 2020/0052950 A1* | 2/2020 | Manolakos | ........... | H04L 5/0048 |
| 2020/0367257 A1* | 11/2020 | Hormis | .................. | H04B 7/155 |
| 2020/0412461 A1* | 12/2020 | Liao | ........................ | H04B 17/12 |
| 2021/0127342 A1* | 4/2021 | Khalid | ................ | H04W 56/001 |
| 2021/0175858 A1* | 6/2021 | Su | ......................... | H04B 1/0475 |
| 2021/0176686 A1* | 6/2021 | Khalid | ................... | H04W 36/22 |
| 2021/0204183 A1* | 7/2021 | Khalid | ............. | H04W 36/0064 |
| 2021/0235503 A1* | 7/2021 | Irukulapati | ....... | H04W 74/0833 |
| 2022/0011394 A1* | 1/2022 | Smith | ................. | H04L 25/0204 |
| 2022/0158770 A1* | 5/2022 | Hong | .................... | H04L 5/0091 |
| 2023/0223999 A1* | 7/2023 | Li | ........................ | H04B 7/0608 |
| | | | | 375/267 |
| 2023/0344508 A1* | 10/2023 | Tseng | ................ | H04W 56/0045 |

OTHER PUBLICATIONS

PCT Written Opinion of the International Searching Authority issued for International application No. PCT/IB2020/053268—Dec. 2, 2020.

* cited by examiner

201 Standalone

200kHz                200kHZ                200kHz

GSM Band                      LTE Band

203 Guard band

200kHz

LTE Band

205 In-Band

200kHz

LTE Band

NB Band 32 branches
1101

24 branches,
with polarization
diversity, mapping
12 subcarriers
1103

8 branches,redundancy
1105

4 ports from DPBF          16 ports          4 ports from DPBF
      1107                    1109                  1111

4 branches, with
polarization diversity,
mapping 2 subcarriers
1201

4 branches, with
polarization diversity,
mapping 2 subcarriers
1203

16 branches, with polarization diversity,
mapping 8 subcarriers
1205

Transmission repetition

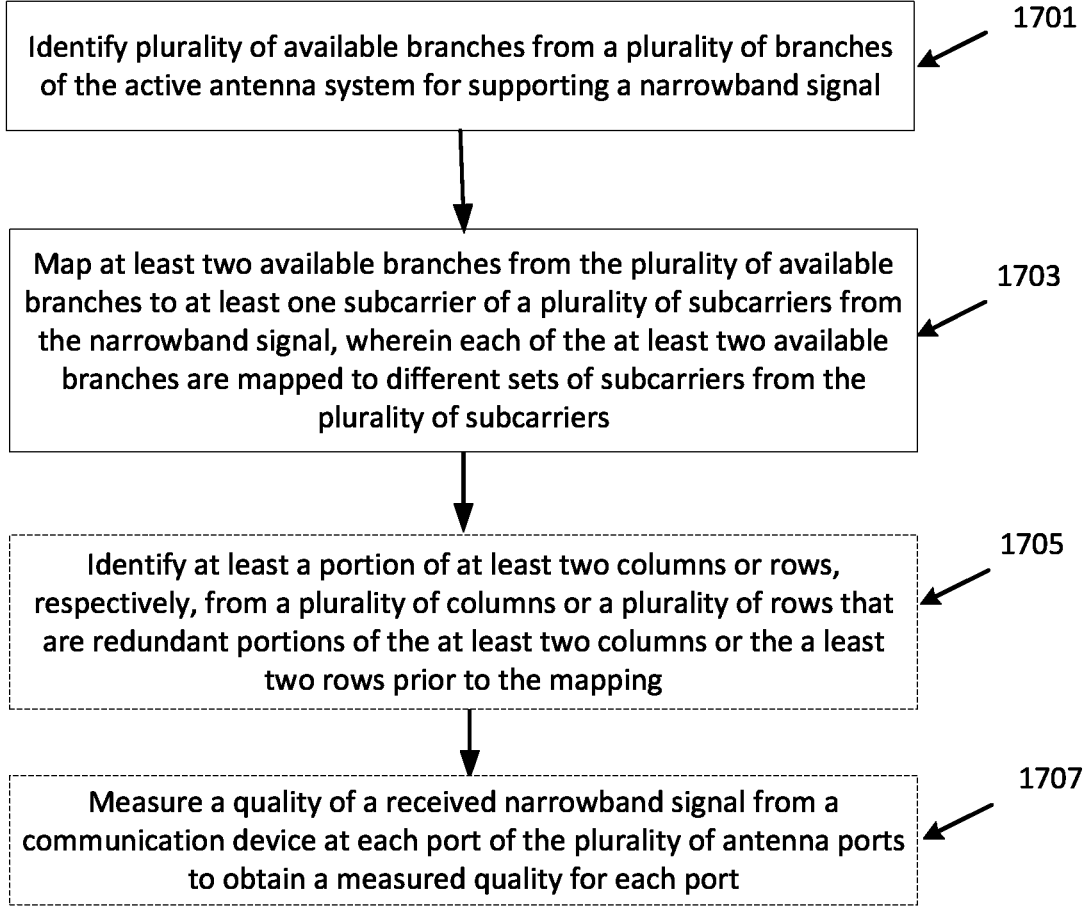

1701

Identify plurality of available branches from a plurality of branches of the active antenna system for supporting a narrowband signal

1703

Map at least two available branches from the plurality of available branches to at least one subcarrier of a plurality of subcarriers from the narrowband signal, wherein each of the at least two available branches are mapped to different sets of subcarriers from the plurality of subcarriers

1705

Identify at least a portion of at least two columns or rows, respectively, from a plurality of columns or a plurality of rows that are redundant portions of the at least two columns or the a least two rows prior to the mapping

1707

Measure a quality of a received narrowband signal from a communication device at each port of the plurality of antenna ports to obtain a measured quality for each port

Figure 17

NB-IoT REALIZATION IN ACTIVE ANTENNA SYSTEM

PRIORITY

This nonprovisional application is a U.S. National Stage Filing under 35 U.S.C. § 371 of International Patent Application Serial No. PCT/IB2020/053268 filed Apr. 6, 2020 and entitled "NB-IoT REALIZATION IN ACTIVE ANTENNA SYSTEM" which is hereby incorporated by reference in its entirety.

TECHNICAL FIELD

The present disclosure relates generally to communications networks and, more particularly, to network node including an active antenna system (AAS) in a telecommunication network for supporting a narrowband signal (e.g., a narrowband Internet of things (NB-IoT)) signal, and related methods and apparatuses.

BACKGROUND

Multi-antenna technologies have an instrumental role in the design of modern radio access technologies (RATs) due to their well-recognized benefits.

For example, they enable array gain, spatial multiplexing, and spatial diversity, which lead to improved coverage, capacity, and robustness. Multi-antenna features may have significantly contributed to the success of long term evolution (LTE) and continue driving its evolution to Rel13 and beyond.

Multi-antenna technologies may have an even larger relevance in the design and performance of new radio (NR). Driven by the 5$^{th}$ generation of radio (5G) mobile broadband (MBB) requirements for Gbps peak rates, NR may be first deployed at a new spectrum >3 GHZ, mainly due to the availability of larger bandwidth. However, extending the operation to >3 GHz also may pose challenges due to decreased radio wave propagation conditions, e.g., the diffraction and propagation loss may increase considerably.

SUMMARY

In various embodiments of the present disclosure, method performed by a network node including an active antenna system in a telecommunication network is provided. The method includes identifying a plurality of available branches from a plurality of branches of the active antenna system for supporting a narrowband signal. The method further includes mapping at least two available branches from the plurality of available branches to at least one subcarrier of a plurality of subcarriers from the narrowband signal, wherein each of the at least two available branches are mapped to different sets of subcarriers from the plurality of subcarriers.

In some embodiments, further operations performed by the active antenna system include identifying at least a portion of at least two columns or two rows, respectively, from a plurality of columns or a plurality of rows of the active antenna system that are redundant portions of the at least two columns or the at least two rows prior to the mapping. The mapping includes performing dual polarized beamforming of the redundant portions of the at least two columns or the at least two rows to create a virtual column or a virtual row having a first beamwidth that is substantially the same as a second beamwidth of one of the plurality of columns or one of the plurality of rows.

In some embodiments, further operations performed by the active antenna system include measuring a quality of a received narrowband signal from a communication device at each port of the plurality of antenna ports to obtain a measured quality for each port. The mapping includes using each port for the mapping that has the measured quality above a threshold.

In some embodiments, further operations performed by the active antenna system include wherein the narrowband signal includes repetition that is re-transmitted; and the mapping includes dynamic mapping of each re-transmission of the narrowband signal.

Corresponding embodiments of inventive concepts for a network node including an active antenna system, computer products, and computer programs are also provided.

In some approaches, downlink (DL) delay in the radio caused by clipping and digital filtering may occur. While hardware may be capable of handling delays, base station (BS) software may not necessarily be capable of handling the delays. Thus, NB-IoT carriers may cause significant delay in the radio. Additionally, when co-clipping is activated, the radio software may set the delay to the longest delay needed. In some products, there may be no solution for this problem due to, e.g., a coverage loss occurring when an operator needs higher transmission power for a NB-IoT deployment. Increasing power amplifier (PA) output power capacity to handle this may be very costly.

Various embodiments of the present disclosure may provide solutions to these and other potential problems. Various embodiments include a method for transmission of NB-IoT with AAS based on mapping single subcarriers of the NB-IoT signal to different antenna branches. As a consequence, potential problems with delays in the radio may be avoided. Thus, a high power boost on the NB-IoT may be possible without increasing PA capability.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIG. 17 is a flow chart illustrating operations of a network node according to some embodiments of inventive concepts

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
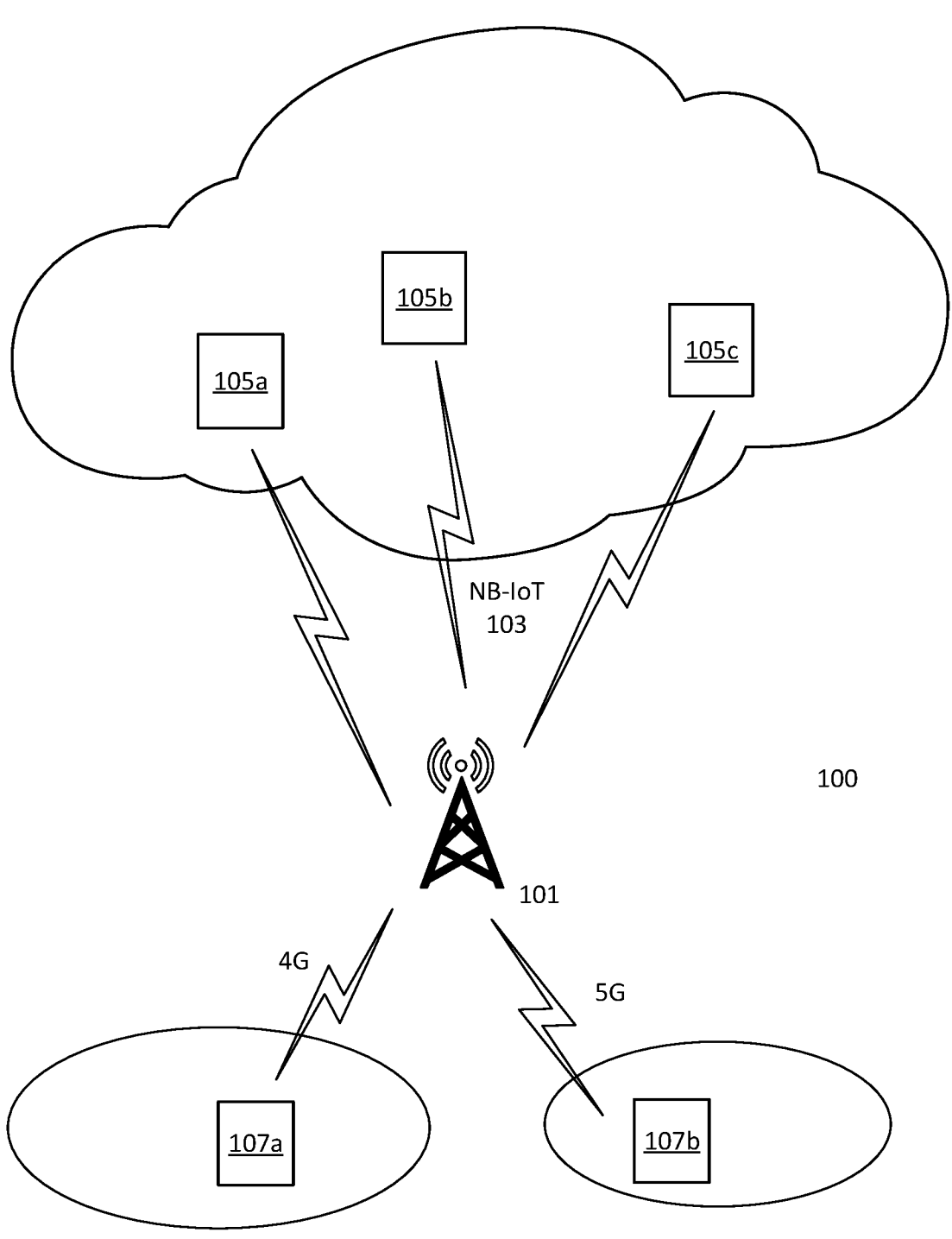
FIG. 1 is a diagram of a telecommunication network having components configured in accordance with various embodiments of inventive concepts.

FIG. 1 is a diagram illustrating an exemplary telecommunication network 100 having components configured in accordance with various embodiments of inventive concepts. Telecommunication network 100 includes base station 101 (also referred to herein as a network node), communication devices 105*a*, 105*b*, 105*c* and communication devices 107*a*, 107*b*. Communication devices 105*a*, 105*b*, and 105*c* are communicatively connected to network node 101 via NB-IoT 103 signals. Communication devices 107*a*, 107*b* are communicatively connected to network node 101 via 4G and 5G signals. While a plurality of communication devices 105*a*, 105*b*, 105*c*, 107*a*, and 107*b* are illustrated in this example, the disclosed embodiments are equally applicable to a situation where a sole communication device is in the coverage area or where a sole communication device is connecting to the corresponding base station 101.

As used herein, communication device refers to a device capable, configured, arranged and/or operable to communicate wirelessly with servers, network nodes and/or other wireless devices. Unless otherwise noted, the term communication device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a communication device may be configured to transmit and/or receive information without direct human interaction. For instance, a communication device may be designed to transmit information to a network on a predetermined schedule, when triggered by an internal or external event, or in response to requests from the radio communication network. Examples of a communication device include, but are not limited to, in an IoT scenario, a machine or other device that performs monitoring and/or measurements, and transmits the results of such monitoring and/or measurements to another UE and/or a network node. The UE may in this case be a machine-to-machine (M2M) device, which may in a 3GPP context be referred to as a machine-type communication (MTC) device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.).

Other examples of a communication device include, without limitation, a smart phone, a mobile phone, a cell phone, a voice over IP (VOIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A communication device may support device-to-device (D2D) communication, for example by implementing a 3GPP standard for sidelink communication, and may in this case be referred to as a D2D communication device. In other scenarios, a UE may represent a vehicle or other equipment that is capable of monitoring and/or reporting on its operational status or other functions associated with its operation.

A communication device as described above may represent the endpoint of a wireless connection, in which case the device may be referred to as a wireless terminal. Furthermore, a communication device as described above may be mobile, in which case it may also be referred to as a mobile device or a mobile terminal.

The following explanation of potential problems is a present realization as part of the present disclosure and is not to be construed as previously known by others. One approach to overcome link budget loss is to use UE-specific beamforming at the eNodeBs (eNBs) for both transmission and reception. While this is already included in LTE, NR will provide higher beamforming gains due to the larger number of antenna elements in arrays at higher frequencies for maintaining a similar coverage area compared to LTE at lower frequencies.

Figure 2:
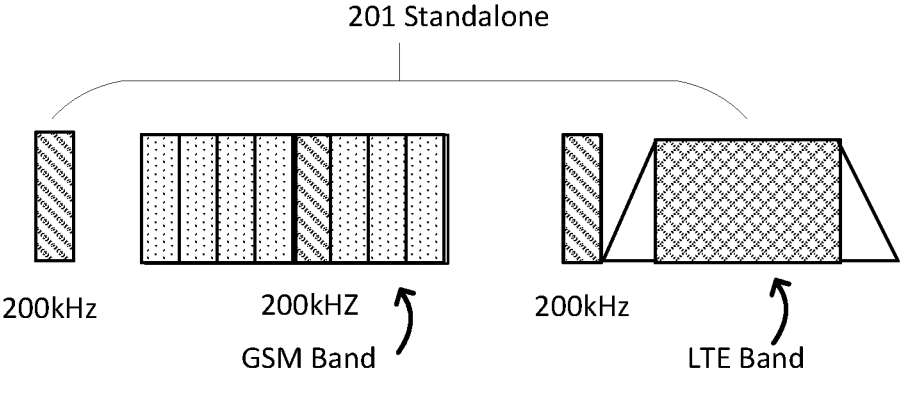
FIG. 2 is signal diagrams illustrating three deployment methods for NB-IoT described by 3GPP.
Figure 2:
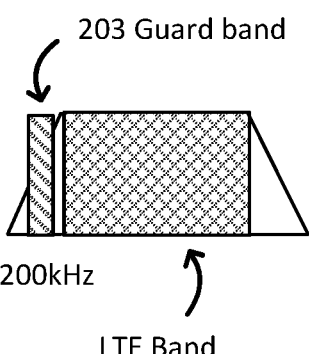
Figure 2:
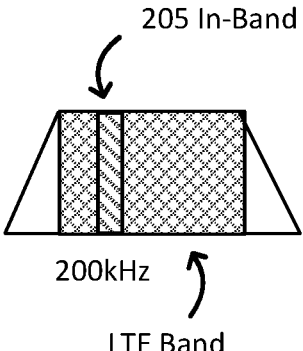
Figure 2:
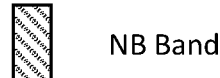

FIG. 2 illustrates three deployment methods for NB-IoT described by 3GPP, for example by 3GPP TS 36.104 Rel. 13.4.0:

Standalone 201: NB-IoT allocated band are outside of existing long term evolution (LTE) band.

Guard band 203: NB-IoT allocated in guard band of LTE/new radio (NR).

In-band 205: NB-IoT allocated in LTE/NR working bandwidth. LTE/NR will reserve some part of the band for NB-IoT deployment.

Clipping will now be discussed.

Figure 3:
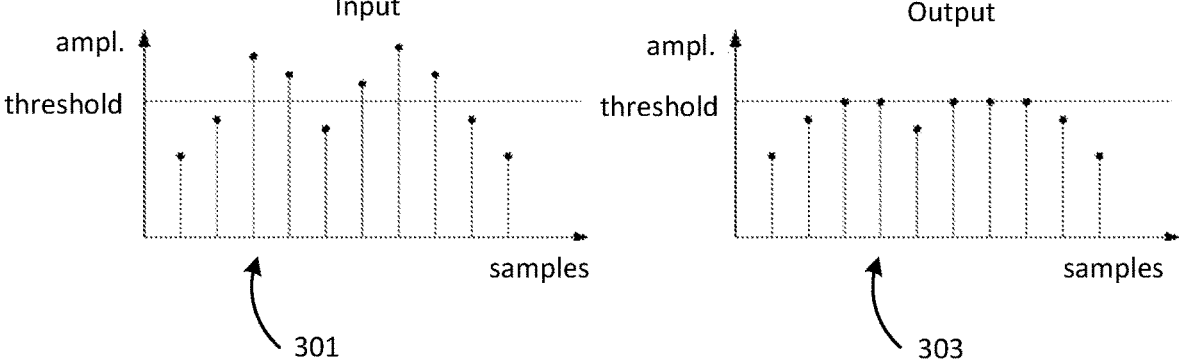
FIG. 3 is a signal plot illustrating clipping a signal at a defined threshold.

A purpose of a clipping feature (e.g., a Crest Factor Reduction (CFR)) is to limit the Peak to Average Power Ratio (PAPR). A straightforward approach may be to just clip the signal at a chosen threshold. FIG. 3 illustrates clipping the signal at a defined threshold. In the time domain, highest amplitude elements of the input 301 are clipped, for all sampling frequency points to output the clipped amplitudes of output 303.

This approach may result in spectrum distortion from clipping. Additionally, for the spectrum, new, additional spectrum elements may be generated by clipping since a signal which is short in time will be wide in frequency domain.

Additionally, out of band emission, e.g. Adjacent Channel Leakage Ratio (ACLR) and spectrum emission mask, may result. A potentially useful CFR should be able to limit the PAPR and limit the out of band emission without too much increase of the Error Vector Magnitude (EVM), which is a measure of in-band distortion.

Figure 4:
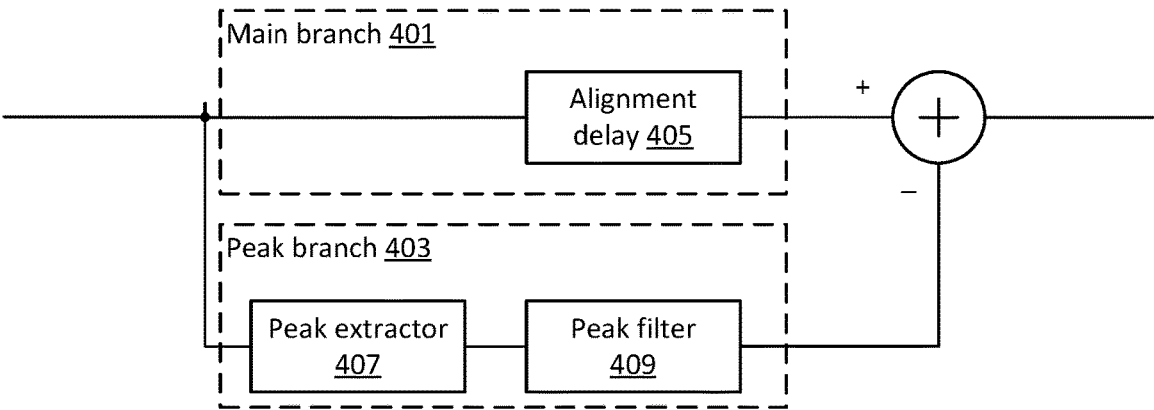
FIG. 4 is a schematic illustrating a Crest Factor Reduction (CFR) circuit.

FIG. 4 illustrates a schematic for a CFR circuit.

Potential problems with stand-alone (SA) NB-IoT downlink (DL) processing will now be discussed. SA NB-IoT is a narrow band signal, therefore, it may be hard to clip in a radio CFR because an efficient radio digital front end (DFE) may not support narrow band processing when a main task is wideband signal handling.

Clip error (e.g., EVM) may be added in the SA NB-IoT carrier by a CFR algorithm. The other carriers may suffer from this with increased EVM when the NB-IoT carrier is added to the other carriers to reduce the effect of the added SA NB-IoT signal in the CFR, the SA NB-IoT signal may be clipped in baseband.

Figure 5:
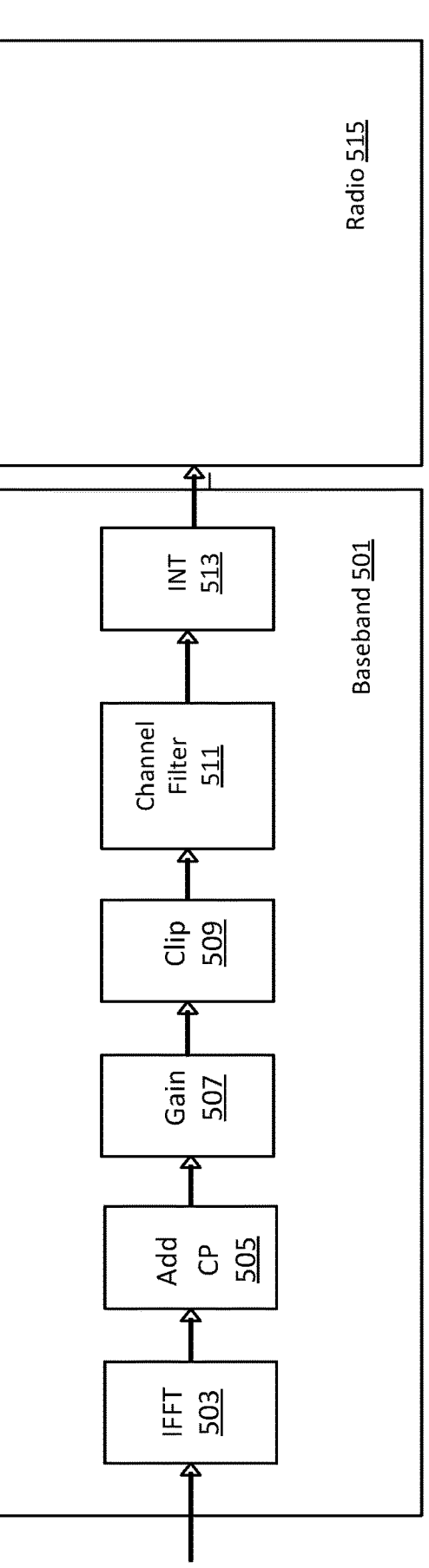
FIG. 5 is a block diagram illustrating stand-alone (SA) NB-IoT downlink (DL) processing blocks.

FIG. 5 illustrates SA NB-IoT DL processing blocks. The processing blocks of baseband 501 include inverse fast Fourier transform (IFFT) 503, add cyclic prefix (CP) 505, gain 507, clip 509, channel filter 511, interpolation (Int) 513; and the clipped signal is input to radio 515.

In the approach of FIG. 5, all carriers are combined before CFR to keep a final fixed PAPR value which is kept in a later transmission path.

The following table illustrates examples of DL delay in the radio caused by clipping and digital filtering.

|  | Filter delay | Clipping delay | Total DL delay |
|---|---|---|---|
| LTE/NR 20 MHz | 5 μs | 5 μs | 10 μs |
| NB-IoT | 13 μs | 60 μs | 73 μs |

It is noted that while hardware may be capable of handling the exemplary delays in the table above, base station (BS) software may not necessarily be capable of handling the delays. As illustrated in the above table, NB-IoT carriers may cause significant delay in the radio.

When co-clipping is activated, the radio software may set the delay to the longest delay needed.

In-band and guard band NB-IoT DL processing will now be discussed.

For in-band NB-IoT DL transmission, due to NB-IoT being located exactly in an LTE/NR band, if it is desired to increase DL transmission power spectral density of NB-IoT to up 10 dB, a problem will occur.

NB and LTE are allocated in different frequency points with a large power density difference and no interference between each other. However, the frequency domain signal will be converted into time domain signal and transmitted into air. Subsequent to the frequency domain data being changed into time domain, NB-IoT and LTE/NR signals are mixed up by OFDM modulation (inverse discrete Fourier transform (IDFT)).

Unavoidable EVM (a kind of clipping noise as discussed above) from clipping will be generated and may be equally shared between LTE/NR and NB-IoT.

Figure 6:
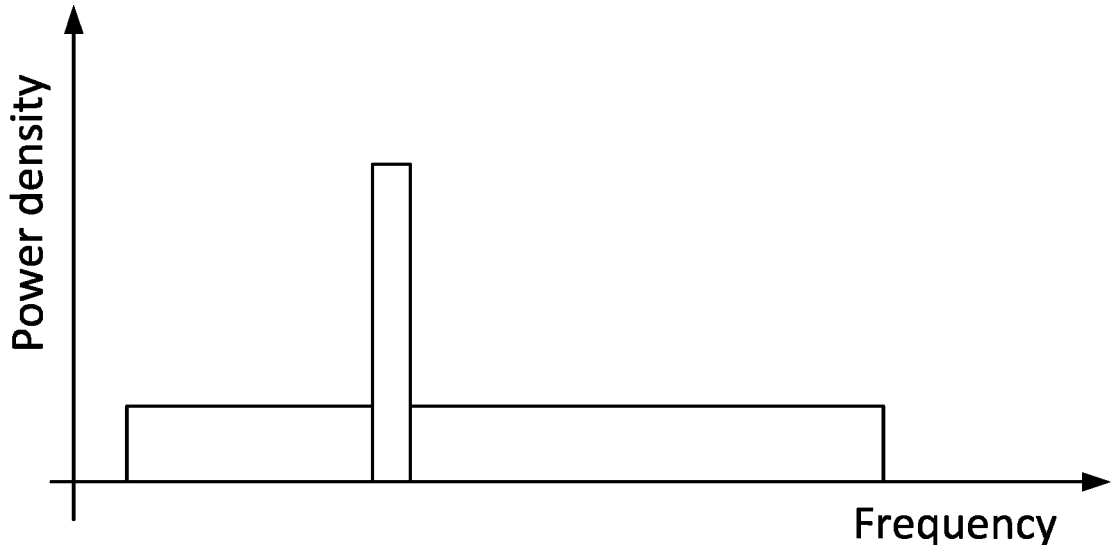
FIG. 6 is a plot illustrating a power spectral density with in-band NB-IoT.

Thus, if NB-IoT boosts its power density to 10 dB or even higher, LTE/NR may suffer large EVM and throughput may be impacted. FIG. 6 illustrates a power spectral density with in-band NB-IoT. As a consequence, a 3GPP definition only requires a maximum 6 dB power boosting between adjacent physical resource block (PRB). In a product, considering system capacity, boosting capacity may be only increased to 7~8 dB.

In some products, there may be no solution for this problem. In other words, an operator may require 7~10 dB higher transmission power for standalone NB-IoT deployment, but for in-band or guard band deployment, the operator may have to suffer at least 7~10 dB coverage loss. Increasing power amplifier (PA) output power capacity to handle this may be very costly. As a consequence, a more efficient method may be needed.

Figure 7:
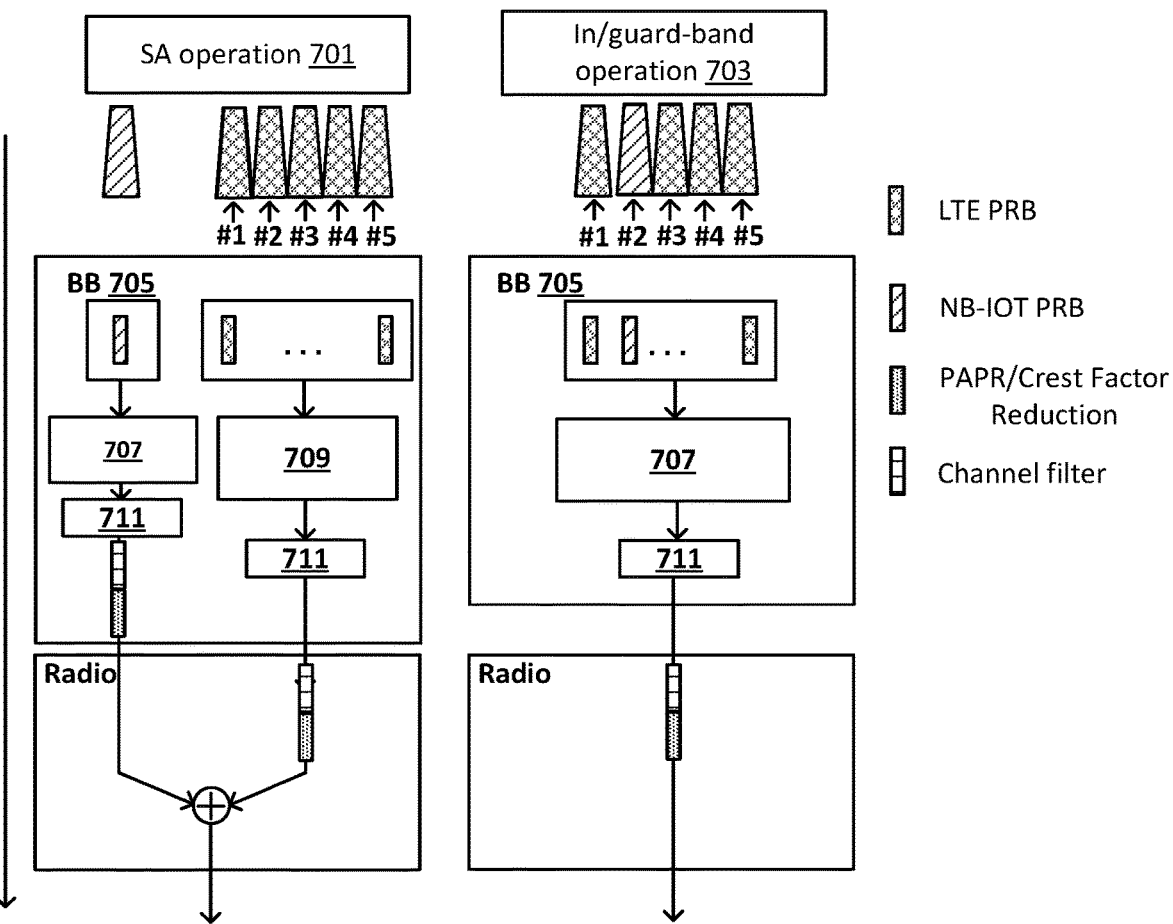
FIG. 7 is a block diagram illustrating NB-IoT DL processing of stand-alone and in-band/guard-band operations.

FIG. 7 illustrates NB-IoT DL processing of stand-alone and in-band/guard-band operation in more detail. Potential reasons for the problem may be slightly different in stand-alone and in-band/guard-band operation of NB-IoT. However, a common source may be the CFR impact introduced by NB-IoT.

As a consequence, current AAS products may not support NB-IoT. Additionally, NB-IoT support may be expensive due to higher output power requirements and/or complex baseband support.

Various embodiments of the present disclosure may provide solutions to these and other potential problems. Some embodiments of the present disclosure include a method for transmission of NB-IoT with AAS that include mapping single subcarriers of the NB-IoT signal to different antenna branches. As a consequence, problems with CFR and long delays in the radio may be avoided. Thus, a high power boost on the NB-IoT may be possible without increasing PA capability.

Various embodiments of the present disclosure include various mappings of NB-IoT subcarriers (e.g., 12 NB-IoT subcarriers) to antenna branches (e.g., 32 or 64 antenna branches). Depending on a precoding scheme used for the NB physical downlink shared channel (NPDSCH), different mappings of the NB-IoT symbols are provided.

Potential advantages provided by various embodiments of the present disclosure may include one or more of the following:

Compatibility with a standard, and ease of implementation;

Flexibility for different BS configurations;

Providing improved energy efficiency capacity;

Decreased or no need for extra processing; and

Supporting NB-IoT in AAS with less or no additional cost;

Adaptive to highly dynamic changes in the environment

A subcarrier per branch will now be discussed.

Figure 8:
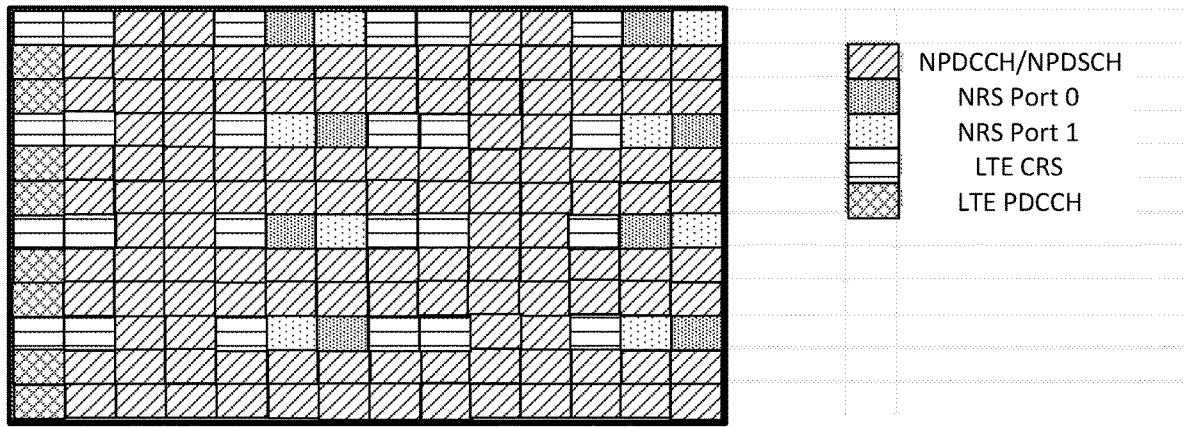
FIG. 8 is a schematic illustrating a NB-IoT resource block.

FIG. 8 illustrates an example NB-IoT resource block.

An example embodiment is provided with allocation for in-band NB-IoT resource elements (RE). For example, there may be 12×14=168 REs in one PRB. 52 REs may be reserved for cell specific reference signals (CRS) and physical downlink control channel (PDCCH), and 116 REs for in-band data symbols, within 12 subcarriers.

Referring to FIG. 8, the LTE, CRS and PDCCH keep normal LTE transmitting. For others related to NB-IoT signaling: narrowband physical downlink control channel (NPDCCH), narrowband physical downlink shared channel (NPDSCH) and narrowband reference signal (NRS), they can be affected according to the methods described below.

Figure 9:
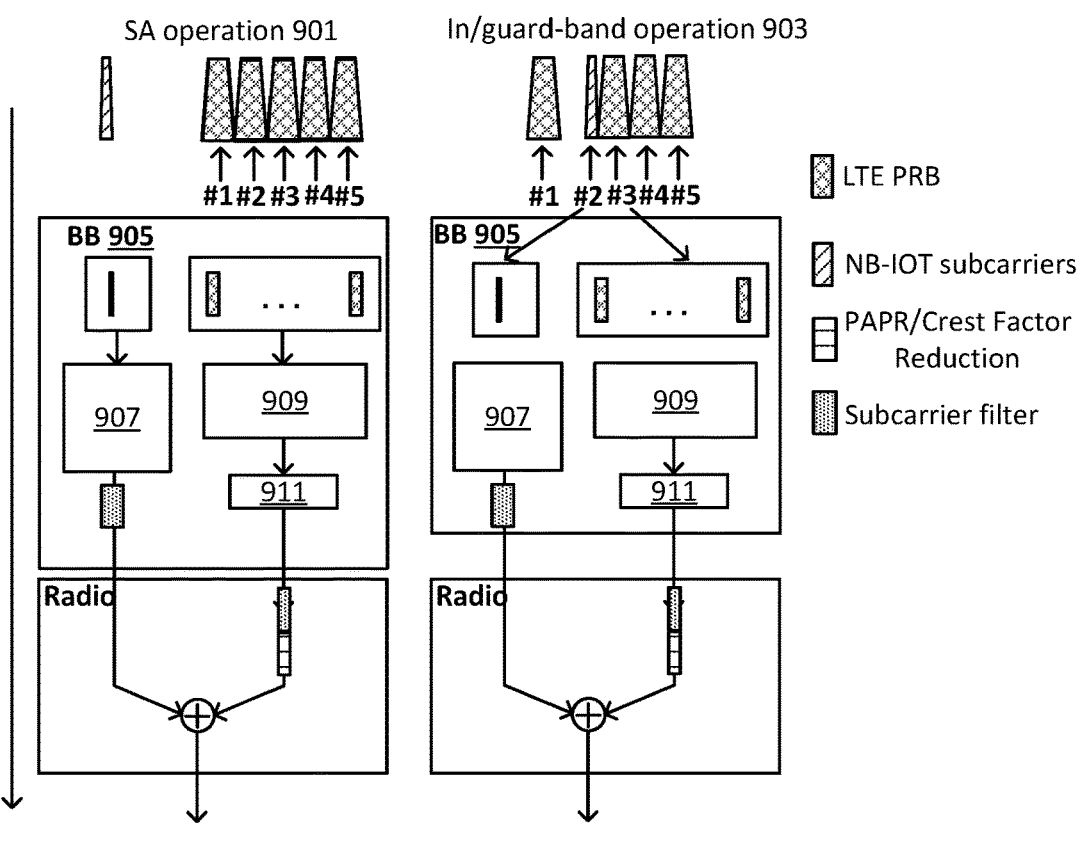
FIG. 9 is a block diagram illustrating mapping one sub-carrier from a NB-IoT PRB to one antenna branch for SA operation and in/guard-band operation, respectively, according to various embodiments of the present disclosure.
Figure 10:
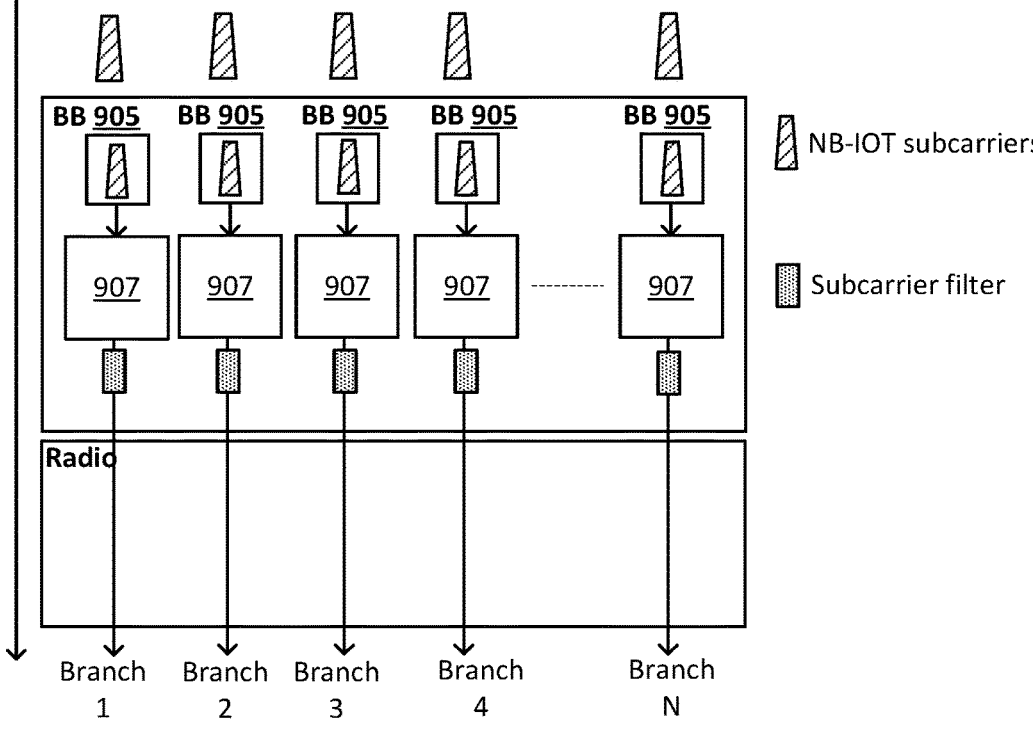
FIG. 10 a schematic illustrating mapping each of a plurality of NB-IoT subcarriers to each of a plurality of antenna branches according to various embodiments of the present disclosure.

To try to avoid impact from CFR, one sub-carrier (also referred to as a "subcarrier") from the NB-IoT PRB can be mapped per one antenna branch. FIG. 9 illustrates mapping one sub-carrier from a NB-IoT PRB to one antenna branch for SA operation and in/guard-band operation, respectively, according to some embodiments of the present disclosure. FIG. 10 illustrates mapping each of a plurality of NB-IoT subcarriers to each of a plurality of antenna branches according to some embodiments of the present disclosure. If the NB-IoT signal (per branch) only contains one sub-carrier, it will not contribute to the PAPR. Mapping sub-carrier from a NB-IoT PRB to one antenna branch also may have a very small impact in the current structure of AAS.

Additionally, the same structure for SA operation and in/guard-band operation may be used.

As a consequence of mapping only single subcarrier to an antenna branch, there is no accumulated effect among the NB-IoT subcarriers.

The NB-IoT subcarrier does not impact the original CFR of a LTE/NR signal. Additionally, because of only a single carrier in frequency domain, channel filtering with a simple realization may be provided, for example, windowing.

In summary:

For SA operation, a simple baseband operation is kept.

For in/guard-band operation, NB-IoT power can be boosted without any change to the original peak to average (PAR) power ratio.

While embodiments discussed herein are explained in the non-limiting context of mapping a single subcarrier to each of a plurality of available branches of an active antenna system, the invention is not so limited. In accordance with some embodiments, the mapping may include mapping two (or more) subcarriers per available branch.

Antenna mapping of various embodiments of the present disclosure will now be further described.

Figure 11A:
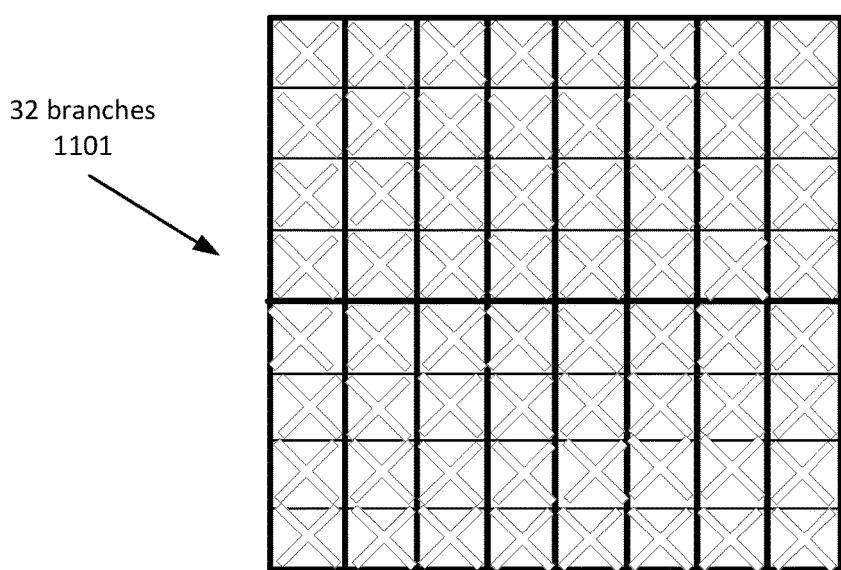
FIG. 11a is an exemplary schematic diagram of an active antenna system with thirty-two branches utilizing transmit diversity transmission mode in NB-IoT (top portion), occupy twenty-four branches with a one to one mapping and eight redundant branches (lower portion) in accordance with various embodiments of inventive concepts.
Figure 11A:
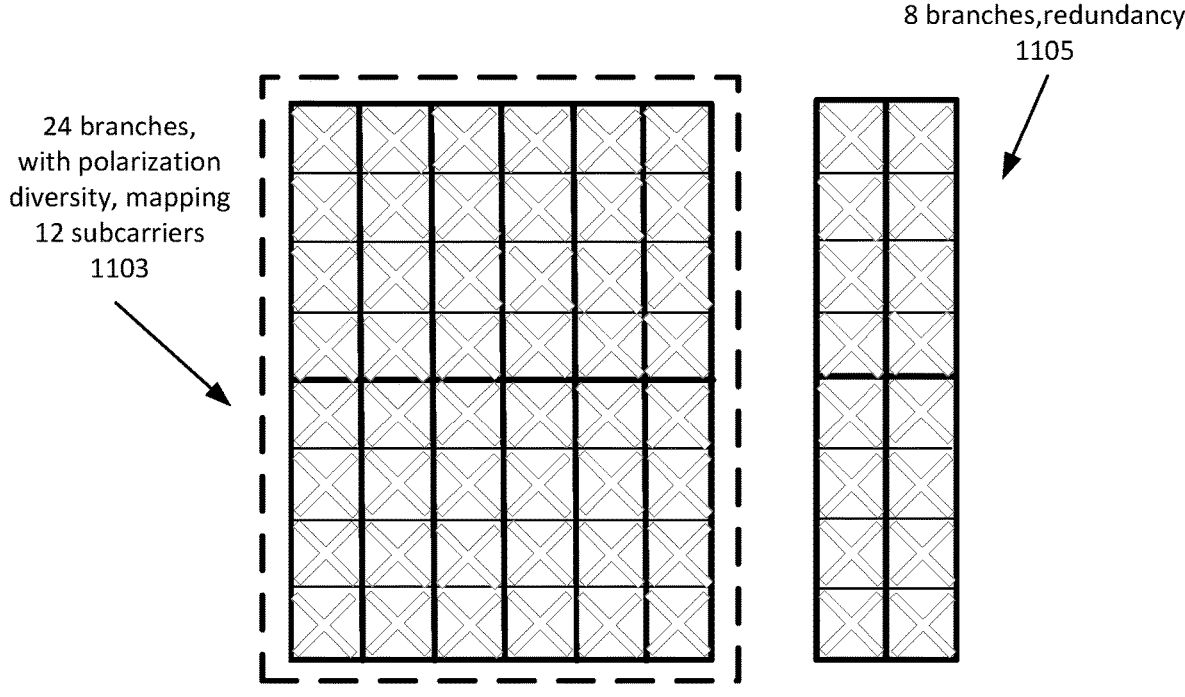

Since there may be twelve (12) NB-IoT subcarriers, different mappings may be provided depending on the number of antenna branches as discussed below. Assuming twelve (12) NB-IoT subcarriers transmitting on thirty-two (32) branches of an AAS having four (4) element sub-arrays, and transmit diversity transmission mode (TM2 diversity mode) is utilized in NB-IoT, this will occupy twenty-four (24) branches with a one to one mapping. Thus, there are still eight (8) redundant branches. This is illustrated in FIG. 11a. Various embodiments of inventive concepts provide a method to use all output power to achieve a higher or highest gain.

While various exemplary embodiments are described herein based on a thirty-two (32) branch AAS with four (4) element sub-arrays, the invention is not so limited, and applies to any array size or geometry. For example, sixty-four (64) branches may be beamformed between two (2) vertical sub-arrays. A mapping will depend on the number of ports of the AAS, as would be understood by one of skill in the art.

Additionally, various embodiments of inventive concepts apply to mapping when TM2 is used, e.g., 12 subcarriers mapped to 24 antenna ports (also referred to herein as antenna branches). If less than twenty-four (24) ports are available, e.g., a 16 port AAS, NB-IoT can be run without TM2 and then only 12 ports are needed. In accordance with some embodiments of inventive concepts, with a 16 port AAS, the subcarriers (e.g., 12 subcarriers) can be mapped to the ports (e.g., 16 ports).

While the following exemplary embodiments of mapping are based on row, the following mapping methods also may be used based on columns in some cases. Exemplary embodiments of mapping methods include, without limitation, the following:

Dual-polarized beamforming of additional ports (e.g., columns)

Static mapping, for example:

Four (4) branches, with polarization diversity, mapping 2 subcarriers,

Sixteen (16) branches, with polarization diversity, mapping 8 subcarriers.

Dynamic mapping with repetition (also referred to herein as time-diversity mapping), for example:

Eight (8) redundancy branches are used by each sub-carrier, when NB-IoT repetition Dynamic mapping with chance (also referred to herein as power based mapping)

Channel dependent mapping

Mapping certain subcarriers to several ports

There may be different precoders for LTE/NR. If a precoder does not use an equivalent power precoder (e.g., a minimum mean square error (MMSE) precoder), there may be power tapering in different branches. As a consequence, some branches may still have power headroom which are not utilized by LTE/NR. If so, NB-IoT subcarriers may be allocated into branches which still have power headroom.

As discussed above, for a thirty-two (32) branch AAS, FIG. 11a (bottom portion) illustrates 24 branches with polarization diversity, mapping twelve (12) subcarriers 1103 and eight (8) redundant branches 1105.

Figure 11B:
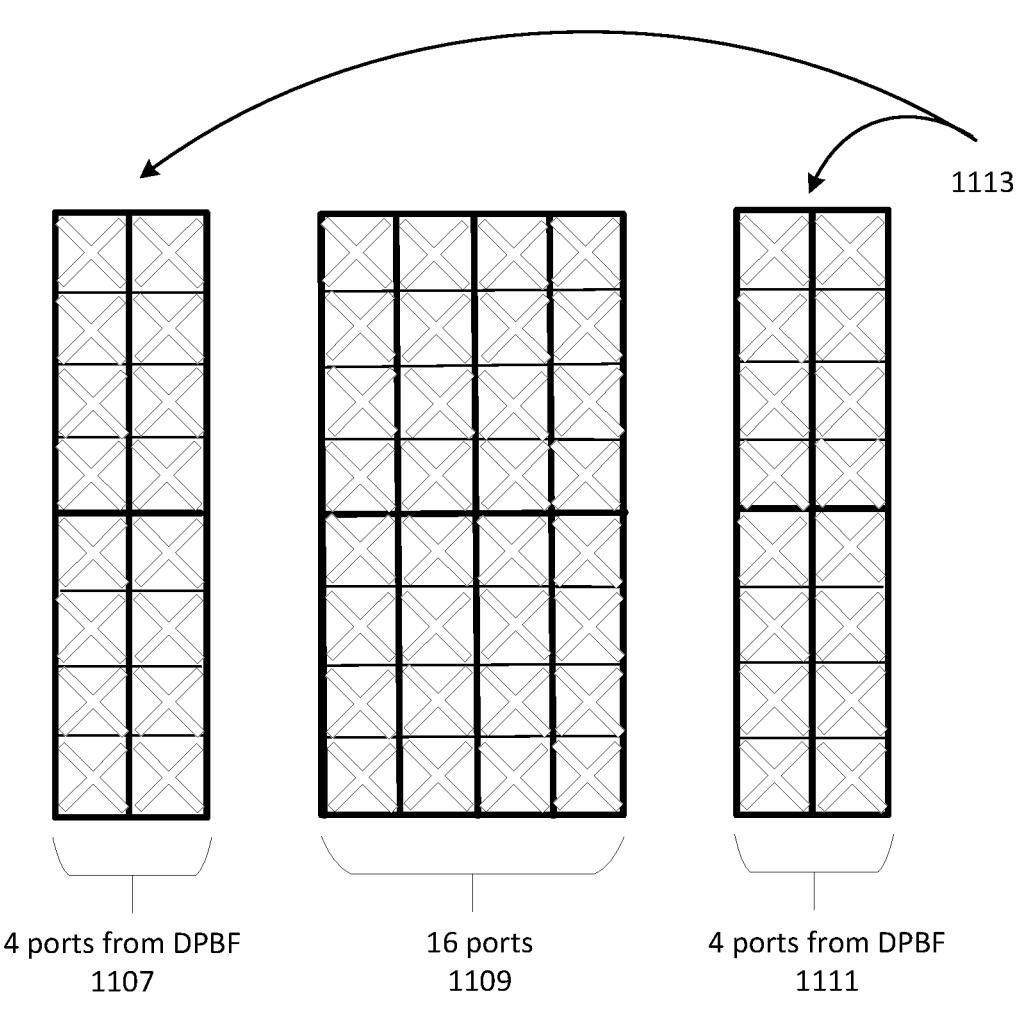
FIG. 11b is a schematic illustrating a mapping for the configuration of FIG. 11a based on dual polarized beam-forming (DPBF) in accordance with some embodiments of inventive concepts.

FIG. 11b illustrates an exemplary embodiment of antenna mapping for the configuration of FIG. 11a based on dual polarized beamforming (DPBF) in accordance with some embodiments of inventive concepts. DPBF is a technique for performing beamforming without narrowing the beams. All branches of the AAS may be used and still cover a cell. DPBF may be used, for example, for common channel beamforming in AAS products. As illustrated in FIG. 11b, two columns (each having two vertical sub-arrays) are beamformed with DPBF to create new "virtual" columns 1107, 1111. Virtual columns 1107, 1111 each provide four (4) ports having substantially the same beamwidth as one column. Four (4) virtual ports from 1107 and four (4) virtual ports from 1111 result in eight (8) virtual ports. Adding sixteen (16) ports 1109 to the eight (8) virtual ports 1107, 1111 results in twenty-four (24) ports. As a consequence, the power of the eight (8) redundant ports of FIG. 11a can be used. While this embodiment is explained in the non-limiting context of beamforming two columns to create new virtual ports 1107, 1109, the invention is not so limited. Instead, partial columns may be used, including without limitation, that DPBF may be used for the upper half of each of two columns to create two ports; and/or the lower half of two columns may be used to create two ports.

Figure 12:
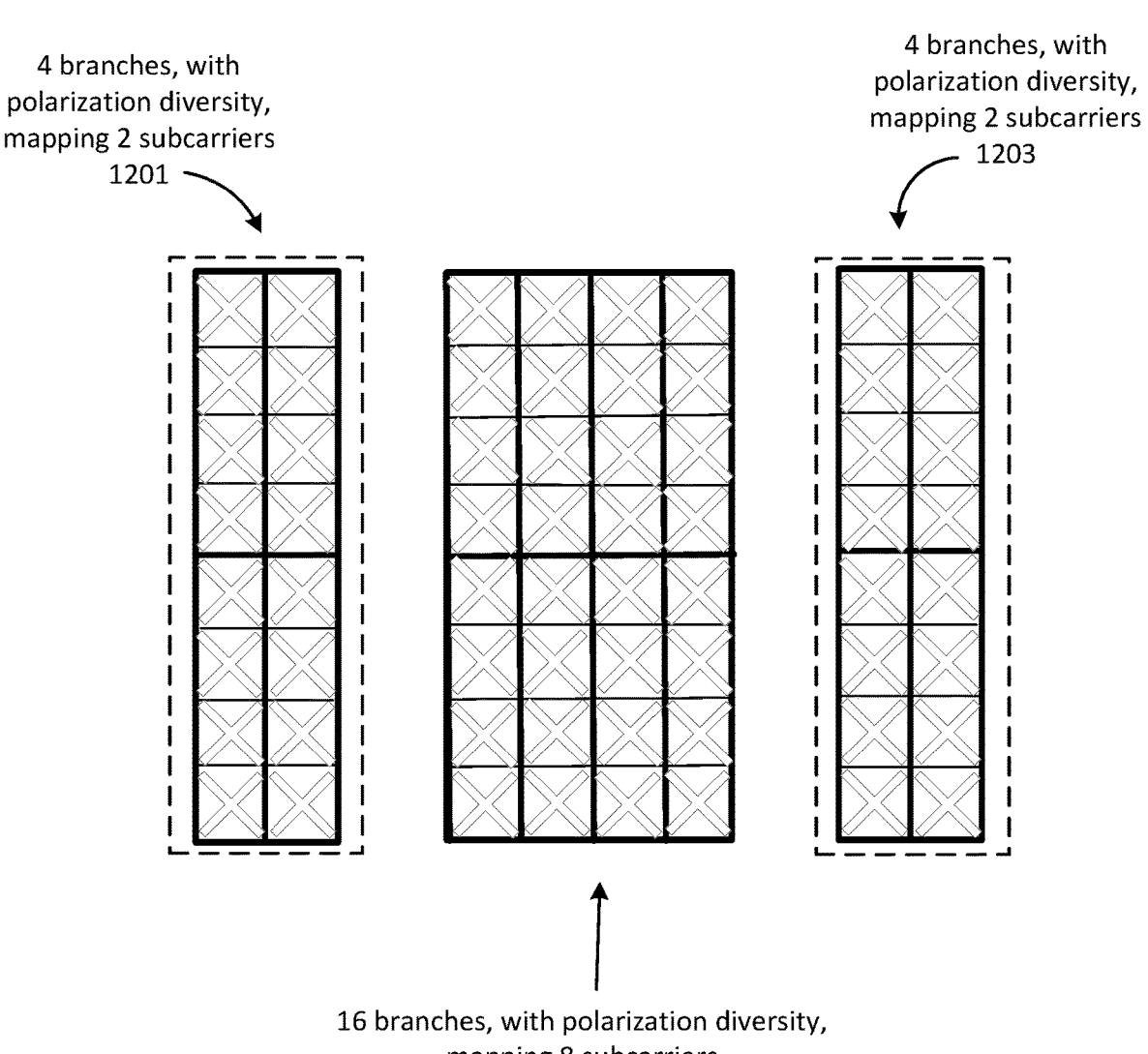
FIG. 12 is a schematic illustrating a static antenna mapping in accordance with some embodiments of inventive concepts.

FIG. 12 illustrates an exemplary embodiment of static mapping in accordance with some embodiments of inventive concepts. Four (4) branches, with polarization diversity, mapping 2 subcarriers is indicated by each of reference numerals 1201 and 1203, respectively. Reference 1205 illustrates sixteen (16) branches, with polarization diversity, mapping 8 subcarriers.

Figure 13:
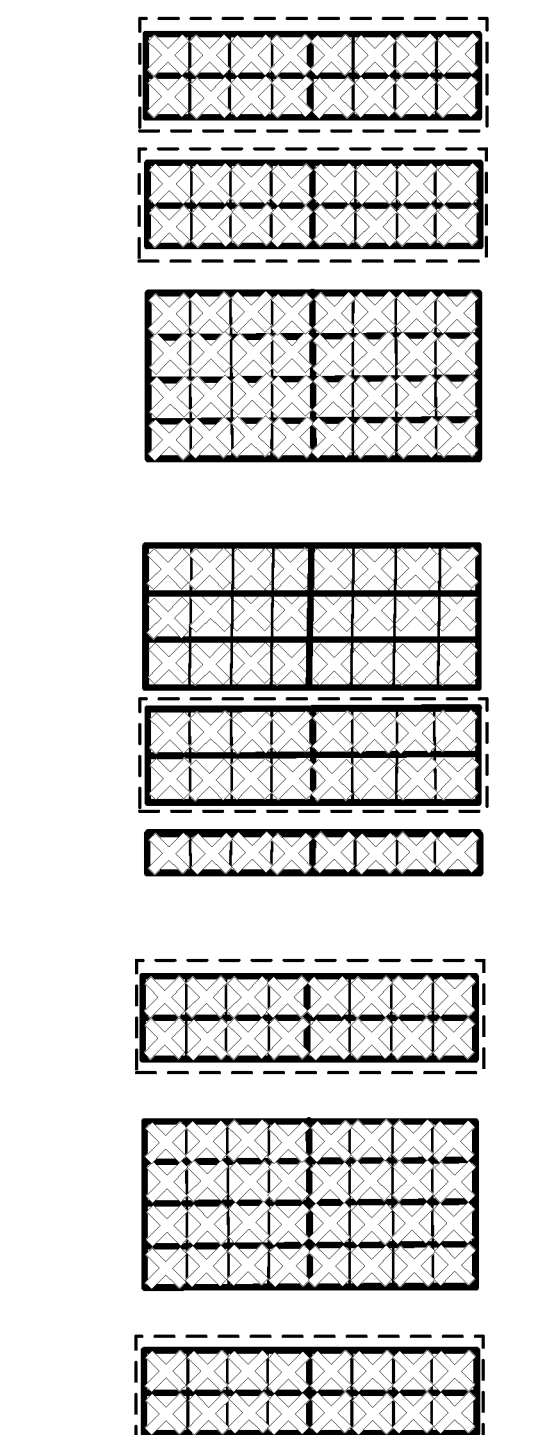
FIG. 13 is a schematic illustrating a dynamic antenna mapping with repetition in accordance with some embodiments of the present disclosure.

FIG. 13 illustrates an exemplary embodiment of dynamic mapping with repetition in accordance with some embodiments of the present disclosure. Since NB-IoT includes repetition in transmission, different mappings can be used for each re-transmission. As a consequence, there may be a time-diversity gain. As illustrated in the exemplary embodiment of FIG. 13, eight (8) redundancy branches are used by each subcarrier and the mapping changes with NB-IoT transmission repetition.

Figure 14:
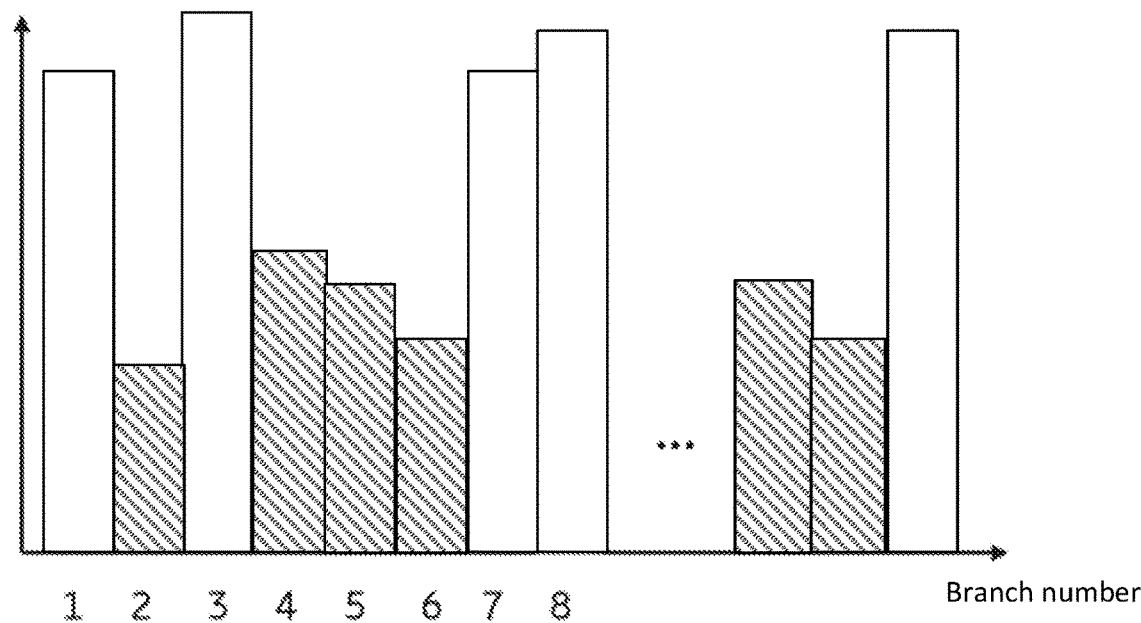
FIG. 14 is a schematic illustrating a power based mapping in accordance with some embodiments of the present disclosure.

FIG. 14 illustrates an exemplary embodiment of power based mapping in accordance with some embodiments of the present disclosure. Different ports of an AAS can be loaded with a different amount of power (from, e.g., PDSCH). For example, this may happen if channel based MMSE transmitter weights are used. FIG. 14 illustrates power loading per branch with NB-IoT, with the solid branches are highly loaded and the patterned branches are low loaded. For power based mapping, the patterned branches are used for NB-IoT.

Channel quality dependent mapping is now discussed. A base station can measure the quality of a received signal from a particular device at each port and use the best ports (e.g., twelve (12) or twenty-four (24) ports) for transmission to the device. Channel quality includes, without limitation, a signal to noise ration (SNR) on an uplink (UL) reference symbol, a reference signal received power (RSRP) report from a channel state information reference signal (CSI-RS) per port, etc.

Mapping certain subcarriers to several ports will now be discussed. Referring to FIG. 11a (bottom portion), in an exemplary embodiment, TM2 precoded NB-IoT subcarriers are mapped to the left twenty-four (24) branches and some of the NB-IoT subcarriers are also mapped to the eight (8) redundancy branches. Thus, some of the NB-IoT subcarriers are mapped to several branches. As illustrated in the example of FIG. 8, a NB-IoT signal includes data and control (e.g., NPDSCH and NPDCCH, respectively) and also includes reference symbols (NRS) on certain subcarriers.

In accordance with some embodiments, only subcarriers containing data or control are mapped to redundant ports. As a consequence, since the channel from these redundant ports are different from the ports where NRS are mapped, the performance may not be sufficient.

In accordance with some embodiments, NB-IoT subcarriers containing NRS are also mapped to redundant ports (that is, in addition to subcarriers containing data or control). As a consequence, a device (e.g., a user equipment (UE)) will see the combination of channels from the first port used and the ports from the redundant part of the array.

While embodiments discussed above are explained in the non-limiting context of a certain mappings, the invention is not so limited. Instead, the mappings can be combined, or used separately. For example, and without limitation, channel quality dependent mapping can be combined with power based mapping so that branches with good quality and available power are used. Additionally, this can also be used when using, e.g., redundant branches. In another example, and without limitation, columns used for DPBF can be changed between different transmissions or re-transmissions.

Figure 15:
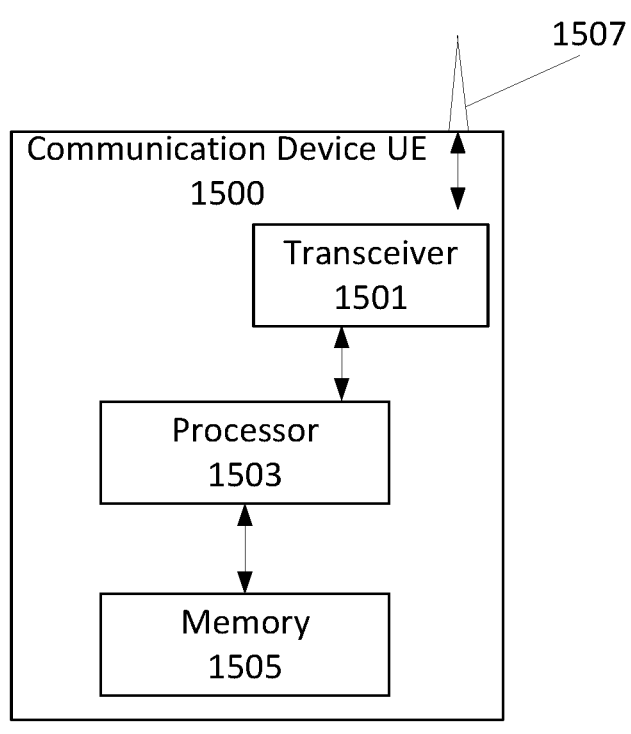
FIG. 15 is a block diagram illustrating a communication device according to some embodiments of inventive concepts.

FIG. 15 is a block diagram illustrating elements of a communication device 1500 (also referred to as a NB-IoT device, a mobile terminal, a mobile communication terminal, a wireless communication device, a wireless terminal, mobile device, a wireless communication terminal, user equipment, UE, a user equipment node/terminal/device, etc.) configured to provide communication according to embodiments of inventive concepts. As shown, communication device 1500 may include an antenna 1507, and transceiver circuitry 1501 (also referred to as a transceiver) including a transmitter and a receiver configured to provide uplink and downlink radio communications with a base station(s) (also referred to as a network node) of a telecommunication network. The communication device 1500 may also include processing circuitry 1503 (also referred to as a processor) coupled to the transceiver circuitry, and memory circuitry 1505 (also referred to as memory) coupled to the processing circuitry. The memory circuitry 1505 may include computer readable program code that when executed by the processing circuitry 1503 causes the processing circuitry to perform operations disclosed herein. According to other embodiments, processing circuitry 1503 may be defined to include memory so that separate memory circuitry is not required. The communication device 1500 may also include an interface (such as a user interface) coupled with processing circuitry 1503, and/or the communication device 1500 may be incorporated in a vehicle.

As discussed herein, operations of communication device 1500 may be performed by processing circuitry 1503 and/or transceiver circuitry 1501. For example, processing circuitry 1503 may control transceiver circuitry 1501 to transmit communications through transceiver circuitry 1501 over a radio interface to a network node (also referred to as a base station) and/or to receive communications through transceiver circuitry 1501 from a network node over a radio interface. Moreover, modules may be stored in memory circuitry 1505, and these modules may provide instructions so that when instructions of a module are executed by processing circuitry 1503, processing circuitry 1503 performs respective operations described below.

Figure 16:
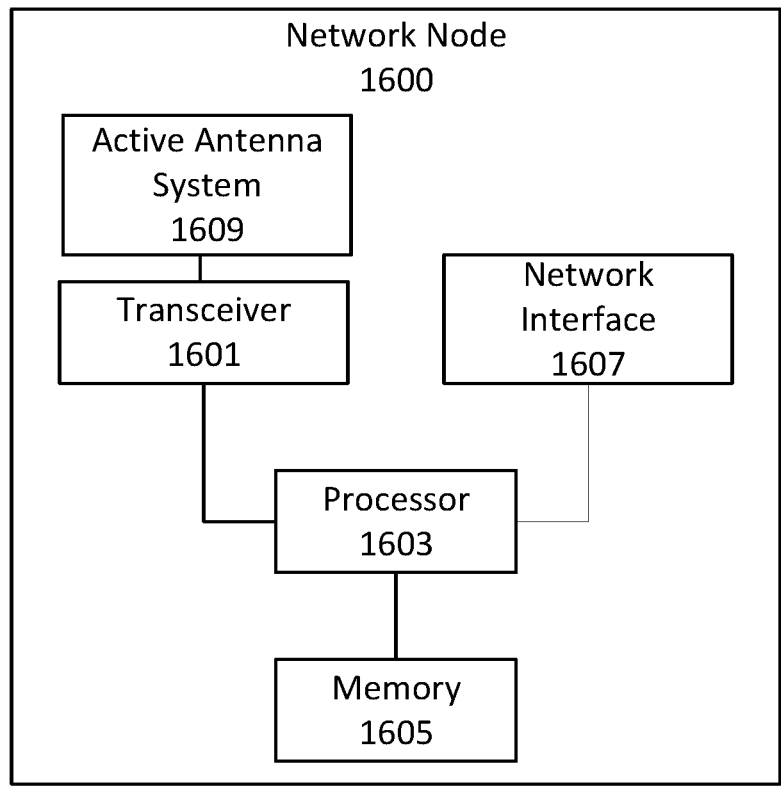
FIG. 16 is a block diagram illustrating a network node according to some embodiments of inventive concepts.

FIG. 16 is a block diagram illustrating elements of an network node 1600 of a telecommunication network configured to provide NB-IoT or cellular communication according to embodiments of inventive concepts. In other embodiments, the functions of the network node 1600 may be implemented in a distributed manner across several nodes in a network. As shown, the network node may include an active antenna system 1609 coupled to transceiver circuitry 1601 including a transmitter and a receiver configured to provide uplink and downlink radio communications with mobile terminals. The network node may include network interface circuitry 1607 configured to provide communications with other nodes (e.g., with other base stations) of the telecommunication network. The network node may also include processing circuitry 1603 (also referred to as a processor) coupled to the transceiver circuitry, and memory circuitry 1605 (also referred to as memory) coupled to the processing circuitry. The memory circuitry 1605 may include computer readable program code that when executed by the processing circuitry 1603 causes the processing circuitry to perform operations according to embodiments disclosed herein. According to other embodiments, processing circuitry 1603 may be defined to include memory so that a separate memory circuitry is not required.

As discussed herein, operations of the network node may be performed by processing circuitry 1603, network interface 1607, and/or transceiver 1601. For example, processing circuitry 1603 may control transceiver 1601 to transmit downlink communications through transceiver 1601 over a radio interface to one or more communication devices and/or to receive uplink communications through transceiver 1601 from one or more communication devices over a radio interface. Similarly, processing circuitry 1603 may control network interface 1607 to transmit communications through network interface 1607 to one or more other network nodes and/or to receive communications through network interface from one or more other network nodes. Moreover, modules may be stored in memory 1605, and these modules may provide instructions so that when instructions of a module are executed by processing circuitry 1603, processing circuitry 1603 performs respective operations (e.g., operations discussed herein with respect to example embodiments relating to network node operations).

Now that the operations that the various components have been described, operations specific to the network node 101 (implemented using the structure of the block diagram of FIG. 16) including an active antenna system will now be discussed with reference to the flow chart of FIG. 17 according to some embodiments of inventive concepts. For example, modules may be stored in memory 1605 of FIG. 16, and these modules may provide instructions so that when the instructions of a module are executed by respective network node processing circuitry 1603, processing circuitry 1603 performs respective operations of the flow chart. Each of the operations described in FIG. 17 can be combined and/or omitted in any combination with each other, and it is contemplated that all such combinations fall within the spirit and scope of this disclosure.

In various embodiments, the operations of the network node include identifying 1701 a plurality of available branches from a plurality of branches of the active antenna system for supporting a narrowband signal. The operations of the network node further include mapping 1703 at least two available branches from the plurality of available branches to at least one subcarrier of a plurality of subcarriers from the narrowband signal, wherein each of the at least two available branches are mapped to different sets of subcarriers from the plurality of subcarriers.

In some embodiments, the number of available branches mapped to the at least one subcarrier can be any number between at least two available branches or greater.

In some embodiments, the narrowband signal is deployed in the telecommunications network in at least one of a standalone operation, a guard band operation, and an in-band operation.

In some embodiments, the mapping (1703) comprises one or more of the following: a dual-polarized beamforming of additional ports, a static mapping, a dynamic mapping with repetition, a dynamic mapping with chance, a channel dependent mapping, and a mapping of a subset of the plurality of subcarriers.

In some embodiments, the mapping (1703) the at least two available branches from the plurality of available branches to at least one subcarrier of a plurality of subcarriers from the narrowband signal includes mapping a maximum of one subcarrier of the plurality of subcarriers from the narrowband signal to each of the at least two available branches of the plurality of available branches.

In some embodiments, the plurality of available branches includes fewer branches than the plurality of branches.

In some embodiments, the at least one subcarrier of the plurality of subcarriers omits a narrowband reference signal, and the mapping (1703) includes mapping an adjacent subcarrier from the narrowband signal to a branch from the plurality of branches closest in proximity to the at least one of the plurality of subcarriers omitting a narrowband reference signal.

In some embodiments, further operations that are performed by the network node include identifying (1705) at least a portion of at least two columns or two rows, respectively, from a plurality of columns or a plurality of rows of the active antenna system that are redundant portions of the at least two columns or the at least two rows prior to the mapping. The mapping (1703) includes performing dual polarized beamforming of the redundant portions of the at least two columns or the at least two rows to create a virtual column or a virtual row having a first beamwidth that is substantially the same as a second beamwidth of one of the plurality of columns or one of the plurality of rows.

In some embodiments, further operations that are performed by the network node include measuring (1707) a quality of a received narrowband signal from a communication device at each port of the plurality of antenna ports to obtain a measured quality for each port. The mapping (1703) includes using each port for the mapping that has the measured quality above a threshold.

In some embodiments, the measured quality includes one or more of: a signal to noise ratio measurement on an uplink reference symbol and a reference signal received power report from a channel state information reference signal.

In some embodiments, each of the plurality of branches is loaded with a different amount of power, and the mapping (1703) includes selecting the available branches having a power loading below a threshold for the each of the plurality of subcarriers from a narrowband signal.

In some embodiments, the mapping (1703) includes mapping a subset of the plurality of subcarriers from the narrowband signal to more than one of the available branches of the plurality of branches.

In some embodiments, the narrowband signal includes a data signal, a control signal, and a plurality of reference symbols for a subset of the plurality of subcarriers. The mapping (1703) is based on at least one of: the subset of the plurality of subcarriers containing the data signal and/or the control signal are mapped to redundant ports of the plurality of ports; and the subset of the plurality of subcarriers containing the plurality of reference symbols are mapped to redundant ports of the plurality of ports.

In some embodiments, further operations that are performed by the network node include that the narrowband signal includes repetition that is re-transmitted; and the mapping (1703) includes dynamic mapping of each re-transmission of the narrowband signal.

Various operations from the flow chart of FIG. 17 may be optional with respect to some embodiments of a network node and related methods. For example, operations of blocks 1705-1709 of FIG. 17 may be optional.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality)

and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Claims are provided below.

The invention claimed is:

1. A method performed by a network node comprising an active antenna system in a telecommunication network, the method comprising:

identifying a plurality of available branches from a plurality of branches of the active antenna system for supporting a narrow band signal, wherein each of the plurality of branches is loaded with a different amount of power; and mapping at least two available branches from the plurality of available branches to at least one subcarrier of a plurality of subcarriers from the narrowband signal, wherein each of the at least two available branches are mapped to different sets of subcarriers from the plurality of subcarriers from the narrowband signal, and wherein the mapping comprises selecting the available branches having a power loading below a threshold for the each of the plurality of subcarriers from the narrowband signal.

2. The method of claim 1, wherein the narrowband signal is deployed in the telecommunications network in at least one of a standalone operation, a guard band operation, and an in-band operation.

3. The method of claim 1, wherein the mapping comprises one or more of the following: a dual-polarized beamforming of additional ports, a static mapping, a dynamic mapping with repetition, a dynamic mapping with chance, a channel dependent mapping, and a mapping of a subset of the plurality of subcarriers.

4. The method of claim 1, wherein mapping the at least two available branches from the plurality of available branches to at least one subcarrier of a plurality of subcarriers from the narrowband signal comprises mapping a maximum of one subcarrier of the plurality of subcarriers from the narrowband signal to each of the at least two available branches of the plurality of available branches.

5. The method of claim 1, wherein the plurality of available branches includes fewer branches than the plurality of branches.

6. The method of claim 1, wherein the at least one subcarrier of the plurality of subcarriers omits a narrowband reference signal, and wherein the mapping comprises mapping an adjacent subcarrier from the narrowband signal to a branch from the plurality of branches closest in proximity to the at least one of the plurality of subcarriers omitting a narrowband reference signal.

7. The method of claim 1, further comprising:

measuring a quality of the received narrowband signal from a communication device at each port of the plurality of antenna ports to obtain a measured quality for each port; and wherein the mapping comprises using each port for the mapping that has the measured quality above a threshold.

8. The method of claim 7, wherein the measured quality comprises one or more of: a signal to noise ratio measurement on an uplink reference symbol and a reference signal received power report from a channel state information reference signal.

9. The method of claim 1, wherein the mapping comprises mapping a subset of the plurality of subcarriers from the narrowband signal to more than one of the available branches of the plurality of branches.

10. The method of 9, wherein the narrowband signal comprises a data signal, a control signal, and a plurality of reference symbols for a subset of the plurality of subcarriers, and wherein the mapping is based on at least one of:

the subset of the plurality of subcarriers containing the data signal and/or the control signal are mapped to redundant ports of the plurality of ports; and the subset of the plurality of subcarriers containing the plurality of reference symbols are mapped to redundant ports of the plurality of ports.

11. The method of claim 1, further comprising:

wherein the narrowband signal includes repetition that is re-transmitted; and wherein the mapping comprises dynamic mapping of each re-transmission of the narrowband signal.

12. A method performed by a network node comprising an active antenna system in a telecommunication network, the method comprising:

identifying a plurality of available branches from a plurality of branches of the active antenna system for supporting a narrowband signal; and mapping at least two available branches from the plurality of available branches to at least one subcarrier of a plurality of subcarriers from the narrowband signal, wherein each of the at least two available branches are mapped to different sets of subcarriers from the plurality of subcarriers from the narrowband signal, and wherein the method further comprises:

identifying at least a portion of at least two columns or two rows, respectively, from a plurality of columns or a plurality of rows of the active antenna system that are redundant portions of the at least two columns or the at least two rows prior to the mapping; and wherein the mapping comprises performing dual polarized beamforming of the redundant portions of the at least two columns or the at least two rows to create a virtual column or a virtual row having a first beamwidth that is substantially the same as a second beamwidth of one of the plurality of columns or one of the plurality of rows.

13. A network node comprising an active antenna system in a telecommunication network, the network node comprising:

the active antenna system comprising a plurality of branches, wherein each of the plurality of branches comprises a plurality of antenna elements connected to at least one antenna port;

at least one processor;

at least one memory connected to the at least one processor and storing program code that is executed by the at least one processor to perform operations comprising:

identifying a plurality of available branches from the plurality of branches of the active antenna system for supporting a narrowband signal, wherein each of the plurality of branches is loaded with a different amount of power; and mapping at least two available branches from the plurality of available branches to at least one subcarrier of a plurality of subcarriers from the narrowband signal, wherein each of the at least two available branches are mapped to different sets of subcarriers from the plurality of subcarriers from the narrowband signal, and wherein the mapping comprises selecting the available branches having a power loading below a threshold for the each of the plurality of subcarriers from the narrowband signal.

14. A network node comprising an active antenna system in a telecommunication network performing operations comprising:

identifying a plurality of available branches from a plurality of branches of the active antenna system for supporting a narrowband signal, wherein each of the plurality of branches is loaded with a different amount of power; and mapping at least two available branches from the plurality of available branches to at least one subcarrier of a plurality of subcarriers from the narrowband signal, wherein each of the at least two available branches are mapped to different sets of subcarriers from the plurality of subcarriers from the narrowband signal, and wherein the mapping comprises selecting the available branches having a power loading below a threshold for the each of the plurality of subcarriers from the narrowband signal.

15. A non-transitory computer readable medium storing a computer program comprising program code to be executed by processing circuitry of a network node, whereby execution of the program code causes the network node to perform operations comprising:

identifying a plurality of available branches from a plurality of branches of the active antenna system for supporting a narrowband signal, wherein each of the plurality of branches is loaded with a different amount of power; and mapping at least two available branches from the plurality of available branches to at least one subcarrier of a plurality of subcarriers from the narrowband signal, wherein each of the at least two available branches are mapped to different sets of subcarriers from the plurality of subcarriers from the narrowband signal, and wherein the mapping comprises selecting the available branches having a power loading below a threshold for the each of the plurality of subcarriers from the narrowband signal.

* * * * *